United States Patent [19]

Jacques et al.

[11] Patent Number: 4,844,823

[45] Date of Patent: Jul. 4, 1989

[54] FABRIC SOFTENER COMPOSITION CONTAINING DI-ESTERIFIED LONG CHAIN FATTY ACID QUATERNARY AMMONIUM SALT

[75] Inventors: Jacques Jacques, Blegny; Jean-Paul Grandmaire, Andrimont, both of Belgium

[73] Assignee: Colgate-Palmolive Company, New York, N.Y.

[21] Appl. No.: 246,756

[22] Filed: Sep. 20, 1988

Related U.S. Application Data

[63] Continuation-in-part of Ser. No. 696,420, Jan. 30, 1985, Pat. No. 4,772,403.

[51] Int. Cl.⁴ ...................... D06M 13/00; D06L 1/16; C09K 3/16; C11D 1/38

[52] U.S. Cl. .................................... 252/8.8; 252/547; 252/8.6

[58] Field of Search ................................ 252/8.8, 547

[56] References Cited

U.S. PATENT DOCUMENTS 4,426,299 1/1984 Verbruggen ......................... 252/8.8

*Primary Examiner*—A. Lionel Clingman

*Attorney, Agent, or Firm*—Norman Blumenkopf; Murray M. Grill

[57] ABSTRACT

Stable aqueous fabric softening compositions based on water-dispersible cationic fabric softeners such as the di-long chain, di-short chain quaternary ammonium salts are provided using synergistic proportions of fatty alcohols to enhance the softening performance. Both concentrated and ready-for-use formulations can be prepared. The active ingredients concentration in the concentrated formula is generally in the range of 11 to 20% by weight while for the ready-for-use formulations, concentration of the active ingredients may range from about 3 to about 8% by weight. In either case, the weight ratio of cationic softening agent to fatty alcohol being in the range of from about 6:1 to 2.8:1. These compositions have low viscosity and are easily dispersible in cold water and are storage stable. Water soluble electrolytes can further reduce viscosity and ethoxylated amines can further increase stability. Methods for making the compositions are also disclosed.

2 Claims, No Drawings

FABRIC SOFTENER COMPOSITION CONTAINING DI-ESTERIFIED LONG CHAIN FATTY ACID QUATERNARY AMMONIUM SALT

BACKGROUND OF THE INVENTION

The present invention relates to fabric softener compositions, especially adapted for use in the rinse cycle of a laundering process and, in particular, the concentrated and ready-for-use aqueous fabric softener compositions which are stable at both low and high ambient temperatures, i.e. the compositions do not form a gel, and which are easily dispersible in water when used.

Compositions containing quaternary ammonium salts having at least one long chain hydrocarbyl group are commonly used to provide fabric softening benefits when employed in a laundry rinse operation; for example, see U.S. Pat. Nos. 3,349,033; 3,644,203; 3,946,115; 3,997,453; 4,073,735; 4,119,545; etc.

For most aqueous softener compositions containing cationic quaternary ammonium compounds of imidazolinium compounds as active ingredients, concentrations of such cationics has, in general, been limited to the range of about 3 to 6 or 7% by weight (see, e.g., U.S. Pat. No. 3,904,533 and U.S. Pat. No. 3,920,565). Such a low concentration is generally necessitated by the fact that cationics form gels in water systems at concentrations at above about 8%. While the use of electrolytes to lower the viscosity of such compositions is known (see, e.g. U.S. Pat. No. 4,199,545), such electrolytes are far from satisfactory. From a functional point of view, the electrolytes often do not perform as required, particularly at concentration of the cationics in the neighborhood of about 12–15%. Further, while the performance of the electrolytes may mitigate some of the gelling problem, their use is far from satisfactory in providing a high concentrated aqueous system of cationics which does not gel or severely change in viscosity within the usual range of temperatures encountered in the handling thereof, for example 0° F. (about −18° C.) up to about 140° F. (about 60° C.).

In U.S. Pat. No. 3,974,076, there is disclosed quaternary ammonium-containing softening composition of conventional cationic concentrations, i.e. about 3% to about 8%. These compositions are characterized by the very small particle size of the substantially water-insoluble quaternary ammonium softening compound, i.e. 90% by weight of the quaternary ammonium compound exists as particles which pass through a 1.2 micron filter. The components of the composition are present in the proportions of from about 2 parts to about 10 parts (preferably from about 3 to about 8 parts) by weight of the water dispersible quaternary ammonium compound; from about 0.1 to 2 parts by weight of the $C_8$ to $C_{20}$ fatty alcohol, with the weight ratio of quaternary compound to alcohol being in the range of from about 100:1 to about 5:1; from about 0.1% to about 2.0% by weight of a nonionic surfactant, the balance being a water-soluble liquid carrier.

In fact, the use of fatty alcohols as softening ingredients or as viscosity regulating agents in fabric softening compositions has been described elsewhere in the patent literature. For example, U.S. Pat. No. 4,213,867 to Cukier and Khan describes fabric conditioning compositions containing quaternary ammonium compounds and fatty alcohols or phosphoric acid esters thereof in admixture with a diluent; the compositions are pumpable at room temperature and are easily dispersed in water. These compositions are highly concentrated base mixes for subsequent dilution prior to distribution and use. The compositions generally contain between about 50 and 80% of quaternary ammonium compound, a diluent ($C_1$ to $C_4$ alkanol plus water) constituting between about 15 and 35% of the base mix and a third component in an amount of from about 5 to 25% which is a $C_{18}$ to $C_{28}$ fatty alcohol or a phosphoric acid ester thereof or mixtures thereof. The base mix is diluted with water to form an aqueous emulsion of 2–10% concentration based on the combined active ingredients, i.e. quaternary ammonium compound and fatty alcohol or phosphate ester.

U.S. Pat. No. 4,386,000 to Turner, et al describes a concentrated fabric softening composition containing a cationic softener and a viscosity control agent which is a combination of a first component, which is a noncyclic hydrocarbon, fatty acid, fatty acid ester, or fatty alcohol, with a water-soluble cationic polymer having an average molecular weight in the range of from about 2,000 to about 250,000. The water-insoluble cationic fabric softener is present in the composition in an amount of from 8% to 22% and the viscosity regulator system includes from about 0.5 to 6% of the first regulator component and from about 0.05 to 1% of the water-soluble cationic polymer as the second regulator component.

The Turner, et al patent is stated to be an improvement over the Verbruggen European patent application No. 79200801.3 corresponding to Verbruggen U.S. Pat. No. 4,426,299. The Verbruggen patent discloses concentrated fabric softening compositions comprising water-insoluble cationic fabric softener and a viscosity control agent which may be a noncyclic hydrocarbon, a fatty acid, or ester thereof, or a fatty alcohol at a ratio of fabric softener to viscosity control agent of from 5:1 to 20:1. According to Turner, et al, these compositions are less effective as viscosity reducing agents and concentrated compositions at temperatures close to or above the Krafft point of the cationic softener.

European Patent Application No. 0086105 describes fabric softening compositions containing a cationic softener, lanolin and a viscosity control agent which may be an electrolyte, a polymer such as polyethylene glycol, a $C_{12}$–$C_{40}$ hydrocarbon and halogen derivatives thereof, $C_9$–$C_{24}$ fatty acids, fatty acid esters thereof, $C_{10}$–$C_{18}$ fatty alcohols or water miscible solvents. The cationic softener's present in amounts of 0.5 to 30% by weight, the lanolin in amounts of from 0.25 to 40% by weight and, when the viscosity control agent is the fatty alcohol, it is present in amounts of 0.25 to 15% by weight. The aqueous medium comprises at least 25% of the composition and preferably at least 40% of the composition. However, none of the actual examples shown in this patent include fatty aclohol viscosity adjusting agent.

United Kingdom patent application GB No. 2,007,734A describes a fabric softener concentrate for subsequent dilution to the final concentration of active ingredients. The concentrate contains a fatty quaternary ammonium salt which contains at least one long chain alkyl group of 8 to 30 carbon atoms, and an oil or substantially water-insoluble compound having oily/fatty properties. The latter includes, among others, long chain fatty alcohols. Proportions of quaternary fabric softener to fatty alcohol compound of 1:9, 1:5, 4:6, 9:10 or 9:1 by weight are shown, generally with a lower alkanol alone or with an additional nonionic surfactant to provide liquid concentrate or diluted composition. The fabric softening compositions, i.e. the concentrates diluted with water, are described as including from 3 to 20% by weight of active ingredients. However, the actual samples only show amounts of active ingredients ranging from about 2.33 to 10% by weight.

French Pat. No. 2,298,600 and corresponding German Pat. No. 2,503,026 to Hoechst A.G. describe liquid aqueous preparations for laundry softening-rinsing agents, which include a germicidal agent. These preparations include a mixture of a quaternary ammonium salt cationic fabric softener and an alkyl imidazolinium compound fabric softener compound at a weight ratio of 2:1 to 1:2; about 1 to 6% by weight of a cationic disinfecting agent; about 0.5 to 5% by weight of a long chain fatty alcohol; about 0.1 to 5% by weight of a lower alkanol having about 1 to 3 carbon atoms; 0 to about 5% by weight of a nonionic emulsifier and the balance water, perfume, coloring matter and optical brighteners.

German DE No. 3,150,179-A1 to Hoechst A.G. relates to concentrated liquid premixtures of cationic fabric softeners with alkoxylated amines and an additional ingredient which may be a fatty alcohol. Example 3 of this patent shows a concentrate containing 40% of the cationic fabric softener, 45% oleyl alcohol and 15% alkoxylated amine. Example 5 shows a concentrate including 70% by weight of the cationic quaternary ammonium salt fabric softener, 20% isostearyl alcohol and 10% alkoxylated amine.

U.S. Pat. No. 3,644,203 to Lamberti, et al discloses a fabric softening composition which is a mixture of a (a) cationic fabric softener and (b) a complex of (i) $C_{12}$ to $C_{22}$ fatty alkanol or alkane diol and (ii) alkali metal alkyl ($C_{12}$ to $C_{18}$) sulfate at a ratio of (a):(b) between 1.4:1 and 10:1 and a molar ratio (i):(ii) between 1:1 and 1:2.

While satisfactory results may be obtained with one or more of these prior art fabric softener compositions still further improvements are desired in terms of softening performance, ease of handling, storage stability, dispersibility in cold water, and overall cost effectiveness. In addition, it is desireable to provide improved fabric softening compositions which do not require or include such additional non-softening components as present in many of these prior art formulations, e.g. nonionic surfactant, lower alcohol cosolvents, cationic polymers, etc.

SUMMARY OF THE INVENTION

The present invention provides low and high temperature stable, aqueous softener compositions based upon cationic fabric softening compounds and a minor amount of a fatty alcohol having an alkyl group of from about 10 to about 22 carbon atoms. A minor amount of water soluble electrolyte and/or an ethoxylated amine can be present as an optional ingredient.

More particularly, the present invention provides stable, aqueous, cold and warm water dispersible fabric softener compositions which consist essentially of (A) 3 to 20% by combined weight of (i) a cationic fabric softener and (ii) a fatty alcohol having an alkyl group with from about 10 to about 22 carbon atoms at a weight ratio of (i):(ii) of from 6:1 to about 2.8:1;

(B) 0 to 0.5% by weight of a water soluble electrolyte;

(C) 0 to 2% by weight of an ethoxylated amine emulsifier; and (D) balance to 100% of water and optionally, one or more of perfume, colorant, optical brightener, and disinfectant.

DETAILED DESCRIPTION OF PREFERRED EMBODIMENTS

The compositions of the present invention are stable aqueous compositions which contain as the active fabric softening components synergistic mixtures of a cationic fabric softener which is preferably a water-dispersible quaternary ammonium compound salt or a water dispersible alkyl imidazolinium compound salt or a water dispersible alkyl imidazolinium compound salt as hereinafter described in more detail, and a fatty alcohol, also as hereinafter described.

The aqueous compositions of this invention contain as the first active fabric softening component at least one cationic fabric softener in an amount generally ranging from about 74 to 86% by weight, preferably from about 75 to 85% by weight of the total active fabric softening components (cationic fabric softener plus fatty alcohol), or on the basis of the total aqueous composition, the amount will be: for a concentrated formulation, from about 8.8 to 15% by weight, preferably from about 10 to 13%, by weight and for a ready-to-use formulation from about 2.2 to 7%, preferably from about 2.3 to 6.6% by weight.

It is understood, of course, that a ready-to-use product is one for which the consumer is instructed to use the product at full strength (i.e. without further dilution-except, of course, for the rinse water, etc.) at the specified dosage level, e.g. $\frac{1}{4}$ to $\frac{1}{2}$ cup per load of wash (usually about 6 to 15 pounds). On the other hand, a concentrated formula is one for which the consumer is instructed to dilute the product (e.g. from about 1 to 4×) to make up the required dosage, e.g. $\frac{1}{4}$ to $\frac{1}{2}$ cup per load of wash. Accordingly, it is clear that for the preferred concentrated formula, the consumer will have at least the perceived notion of greater economy and flexibility in use.

Softening agents are used to render fabrics or textile soft, and the terms "softening" and "softener" refer to the handle, hand, touch, or feel; this is the tactile impression given by fabrics or textiles to the hand or body and is of aesthetic and commercial importance. The cationic fabric softeners used in the present invention can be any of the commercially available and known cationic fabric softeners and preferably are of the water-dispersible quaternary ammonium compound salt or alkyl imidazolinium compound salt type including at least one, and preferably two hydrophobic groups containing at least 12 and preferably at least 14 carbon atoms.

One preferred class of the cationic softeners are the quaternary ammonium salts of the formula I:

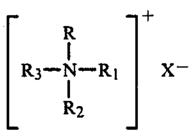

wherein R represents a hydrocarbyl group of from about 12 to 24 and preferably about 14 to 22 carbon atoms; $R_1$ represents lower alkyl of 1 to 4, preferably 1 to 3, carbon atoms, or a hydrocarbyl group of from 12 to 24, preferably 14 to 22, carbon atoms; $R_2$ and $R_3$ represent lower alkyl of 1 to 4, preferably 1 to 3, carbon atoms, and X represents an anion capable of imparting water solubility or dispersibility, such as halide, e.g. chloride, bromide and iodide; sulfate, methosulfate, nitrite, nitrate, phosphate, and carboxylate, e.g. acetate, adipate, propionate, phthalate, benzoate, oleate, etc.). The hydrocarbyl groups are preferably alkyl but may be alkenyl, aryl, or aralkyl and may include various substituents or interrupting groups such as halo, amide, hydroxyl, and carboxyl substituents or interrupting functional groups and ethoxy or polyethoxy interrupting groups. In addition, one or more of the lower alkyl groups may also be substituted, for example, by an hydroxy group. Typical cationic fabric softener compounds of formula I include the following:

distearyl dimethyl ammonium chloride
ditallow dimethyl ammonium chloride
dihexadecyl dimethyl ammonium chloride
distearyl dimethyl ammonium bromide
di(hydrogenated tallow) dimethyl ammonium bromide
distearyl di(isopropyl)ammonium chloride
distearyl dimethyl ammonium methosulfate.

A highly preferred class of the cationic fabric softeners of formula I are the water-insoluble compounds wherein the groups R and $R_1$ are $C_{14}$ to $C_{18}$, $R_2$ is methyl or ethyl and $R_3$ is methyl, ethyl, isopropyl, n-propyl, hydroxyethyl or hydroxypropyl.

Another preferred class of the cationic fabric softeners are diesterified long chain fatty acid dilower alkyl quaternary ammonium salts and diesterified long chain fatty acid lower alkyl lower hydroxy alkyl quaternary ammonium salts. This class of cationic fabric softeners can be represented by the general formula:

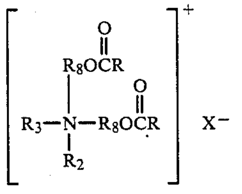

wherein X, R, $R_2$ and $R_3$ have the same meanings as given above for formula I and $R_8$ is a lower alkyl of 1 to 4, preferably 1 to 3, especially 2 carbon atoms. Preferably, R, $R_2$ and $R_3$ have the same meanings as in the above highly preferred class of compounds of formula I. Such compounds are commercially available from, for instance, Stepan Chemical Co. under the Stepantex trademark, such as Stepantex VHR90 which has the formula:

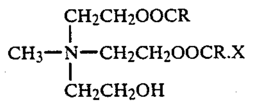

where RCO is derived from tallow or coco fatty acids and X may be chloride or sulfate.

A second preferred class of the cationic fabric softener active ingredient are the imidazolinium compounds of the formula II:

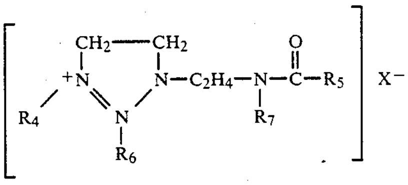

wherein $R_4$ is hydrogen or lower alkyl of 1 to 4 and preferably 1 to 3 and especially preferably 1 or 2 carbon atoms, R5 is an alkyl containing from 9 to 25 carbon atoms, preferably linear higher alkyl of from about 13 to 23 and especially preferably 13 to 19 carbon atoms, $R_6$ is an alkyl containing from 8 to 25 carbons and preferably a substantially linear higher alkyl group of about 13 to 23, and preferably 13 to 19 carbon atoms; $R_7$ is hydrogen or an alkyl containing from 1 to 4 carbon atoms, preferably 1 or 2 carbon atoms, and X is as defined above.

Typical examples of the alkyl imidazolinium compounds of formula II include:

methyl-1-tallow amido-ethyl-2-tallow imidazolinium methyl sulfate, methyl1-oleyl amido-ethyl-2-oleyl imidazolinium methyl sulfate, 1-methyl-1-(palmitoylamido)-ethyl-2-octadecyl-4,5-dihydroimidazolinium chloride, 2-hepadecyl-1-methyl-1-(2-stearylamido)-ethyl-imidazolinium chloride, 2-lauryl-1-hydroxyethyl-1-oleyl-imidazolinium chloride.

The water dispersible cationic fabric softeners which can be used in the compositions of the present invention are not limited to those described above and any of the other known useful water dispersible cationic fabric softeners can be used. Furthermore, mixtures of the above mentioned cationic fabric softeners can also be used.

The second essential fabric softening ingredient is the fatty alcohol wherein the hydrophobic group may be a straight or branched chain alkyl or alkenyl group having from about 10 to 24, preferably from about 10 to 20, especially preferably from about 12 to 20 carbon atoms. Specific examples of the fatty alcohol include decanol, dodecanol, tetradecanol, pentadecanol, hexadecanol, octadecanol, lauryl alcohol, palmityl alcohol, stearyl alcohol, oleyl alcohol, and mixtures thereof. Furthermore, the fatty alcohol may be of natural or synthetic origin and may include, for example, mixed alcohol, such as $C_{16}$ to $C_{18}$ alcohols prepared by Ziegler polymerization of ethylene.

The fatty alcohol is present in the composition in a minor amount relative to the cationic fabric softener such that the ratio, by weight, of the cationic fabric softener to fatty alcohol is in the range of from 6:1 to 2.8:1, preferably from about 6:1 to 3:1, especially preferably about 4.5:1 to 3.5:1. Within these proportions, the fatty alcohol is present in the formulation, based on the total weight of the aqueous composition, in the range of from about 1.4 to 5% by weight, preferably about 2.0 to 4% by weight, for the concentrated formulation, and in range of from about 0.4 to 2%, preferably from about 0.1 to 1.4%, by weight for the ready-to-use formulation.

The total amount of the active fabric softening components (cationic fabric softener plus fatty alcohol) is at least 11% by weight, preferably at least 12% by weight, more preferably about 12 to 20% by weight, especially preferably 12 to 16% by weight, for the concentrated formulation. Within these high concentrations of the fabric softening components, highly stable and pourable compositions can be obtained which do not gel upon addition to cold or warm water. Furthermore, in view of the high total amounts of the active fabric softening components, the consumer is provided with a wide choice in suitable dosages which can still provide effective softening over wide ranges of fabric loads. Generally, however, it is sufficient to provide the compositions of this invention in amounts which provide a concentration in the range of from about 10 ppm to 1,000 ppm, preferably from about 50 ppm to about 500 ppm, of total active ingredients when added to the rinse liquor of a washing cycle. Accordingly, the formulations should be diluted prior to use in an amount depending on the starting concentration and desired level of performance, from about 1 to 4 times, preferably 2 to 3 times with water. Tap water is sufficient for this purpose. For the ready-to-use formula, which can be added directly to the fabrics, generally during the rinse cycle of the overall washing operation in an automatic washing machine, the total amount of active softening ingredients will be from about 3 to 8%, preferably from about 3.5 to 6% by weight, based on the total composition.

In view of the synergistic interaction between the two active softening components, formulations can be used with reduced total levels of active ingredients while maintaining the softening efficiency equivalent to the present best commercially available softening systems.

It is one of the outstanding advantages of the present invention that it is not required to include any additional ingredients such as nonionic surfactant emulsifiers, lower alkanols, etc. to formulate stable homogeneous low viscosity pourable compositions from the mixed cationic fabric softener and fatty alcohol. However, it is often desirable to include a minor amount of an electrolyte to further decrease the viscosity of the formulation and/or an ethoxylated amine to further increase the stability against separation of the suspended phase of the formulation.

When desired to provide still lower viscosities of the final aqueous compositions, any of the known water-soluble electrolytes can be included in the compositions of the present invention. When present the electrolyte material can be used in amounts up to about 1.5% by weight, preferably up to about 1.0% by weight, especially preferably up to about 0.5% by weight. The minimum amount of the electrolyte will be that amount sufficient to provide the desired viscosity and will generally range from a minimum of about 30 centipoise (cp) up to about 300 cp, preferably in the range of 50 to 150 cp, as measured at 25° C. Particularly suitably electrolytes includes sodium chloride and calcium chloride and other useful electrolytes include sodium formate, sodium nitrite, sodium nitrate, sodium acetate, as well as water-soluble salts of other cations, such as potassium, lithium, magnesium, ammonium, and the like.

The ethoxylated amine compounds contemplated herein as emulsifiers are based upon ethoxylated long chain amines and the inorganic acid and organic acid salts thereof. The amines are typically $C_{12}$ to $C_{30}$ aliphatic amines, and preferably $C_{12}$ to $C_{20}$ amines and admixtures thereof reacted with from one to about 100 moles of ethylene oxide. The amines may also be reacted with propylene or butylene oxide and then with ethylene oxide. The final oxyalkylated amine should be a water-soluble product. Of particular value are the amines derived from natural fatty acids, such as the Armeens and Ethomeens and these generally comprise a mixed alkyl ranging from $C_{10}$ to $C_{18}$, or $C_{12}$ to $C_{16}$, or $C_{12}$ to $C_{15}$, or $C_{16}$ to $C_{18}$, and the like. Preferred ethoxylated amines are those containing from about 5 to about 50 moles of condensed ethylene oxides and more preferred are ethoxylated amines with about 10 to about 35 moles condensed ethylene oxide. Most preferred contain 12 to 20 moles of ethylene oxide.

Any of the common inorganic acids can conveniently be used to form the neutral salts of the ethoxylated amine compounds. Suitable inorganic acids include, for example, HCl, $HNO_3$, $H_2SO_4$, $H_3PO_4$, etc. Similarly, the organic acids used to form the amine salts are not particularly restricted. Thus, such short chain aliphatic monocarboxylic organic acids as acetic acid, propionic acid, butyric acid, acrylic acid, etc.; aromatic acids, such as benzoic acid, naphthoic acid, toluic acid, etc.; long chain aliphatic monocarboxylic acids, as lauric, dodecanoic, myristic, tetradecanoic, pentadecanoic, palmitic, hexadecanoic, heptadecanoic, stearic, oleic, linoleic, linolenic, eleostearic, ricinoleic, dihydroxystearic, nonadecanoic eicosanoic, arachiodonic, etc., can all be used in this invention. The use of the ethoxylated long chain amine salts with long chain organic acids to provide stable concentrated aqueous fabric softening compositions is disclosed in applicants' copending application Ser. No. 493,450, filed May 11, 1983, the pertinent disclosure of which is incorporated herein by reference.

The amine compound emulsifiers may be added in amounts effective to increase stability of the formulation while at the same time providing some softening action as previously disclosed by applicants in the case of the long chain organic acid salts. Suitable amounts are generally up to about 3%, preferably 0.1 to 3%, for example 0.5 to 2%, based on the total weight of the composition.

In addition to the ethoxylated amine compounds mentioned above, any of the water-soluble ethoxylated amine compounds disclosed in U.K. patent application GB No. 2,133,415A, published July 25, 1984, especially the ethoxylated monoamines can be used for their emulsifying properties.

In addition to the foregoing components of the softening compositions of this invention, there may also be included numerous conventional, supplemental and optional ingredients which do not adversely affect the stability and/or functional characteristics of the instant compositions. Thus, for example, there may be present the ubiquitous perfumes, dyes, pigments, opacifiers, germicides, optical brighteners, anti-corrosion agents, preservatives, and the like. Where used, each of these components may comprise up to about 0.5%, preferably up to about 0.2%, for example from 0.001% to about 0.1% by weight of the aqueous composition. The use of perfumes, dyes and optical brighteners are especially preferred additives in terms of consumer appeal.

As used in the claims appended hereto, the term "consisting essentially of" is intended to restrict the scope of the present invention to only the named ingredients and minor amounts of such additional components which may enter into the instant compositions by virtue of being present in one or the other of the raw ingredients or any additional ingredients which do not have a material effect on the basic properties, i.e. softening performance, of the present formulations. Thus, it is generally recognized that many of the commercially available cationic fabric softeners are provided as, for example, a 75% solution in, for example, isopropyl alcohol. Thus, such minor amounts of isopropyl alcohol or other solvent materials may also be present in the compositions of this invention. However, in the present invention, no additional amounts of organic cosolvents such as the lower alkanols, which are often added to the prior art fabric softening compositons as viscosity adjusting agents, are necessary or required and their use should be avoided.

The balance of the compositions of the present invention is provided by water which may be distilled, deionized or tap water.

As noted above, it is generally not required to add any additional ingredients to the active fabric softening components in order to provide the homogeneous stable low viscosity pourable and dispersible fabric softening compositions of this invention.

For example, in the case of one preferred embodiment of the invention wherein the cationic fabric softener is distearyl dimethyl ammonium chloride (DSDMAC) and wherein the fatty alcohol is a $C_{16}$–$C_{18}$ alkyl alcohol, the composition is prepared directly using a high pressure homogenizer. Thus, a mixture of DSDMAC and the $C_{16}$–$C_{18}$ alcohol when dispersed in hot water forms a gel which can be broken in a high pressure homogenizer resulting, after cooling, in a stable liquid product.

The following examples will serve to illustrate the present invention without being deemed limitative thereof. Parts are by weight unless otherwise indicated.

Example 1

This example shows the preparation of a stable liquid flowable low viscosity concentrated formulation using a high pressure homogenizer. The following formulations are prepared.

| | A | B | C | D | E | F | G |
|---|---|---|---|---|---|---|---|
| Distearyl dimethyl ammonium chloride (DSDMAC) | 12.60 | 12.00 | 11.44 | 10.50 | 9.66 | 8.40 | 7.42 |
| $C_{16}$–$C_{18}$ fatty alcohol(FA) | 1.40 | 2.00 | 2.56 | 3.50 | 4.34 | 5.60 | 6.54 |
| Perfume | 0.90 | 0.90 | 0.90 | 0.90 | 0.90 | 0.90 | 0.90 |
| Color material (0.2% solution) | 1.20 | 1.20 | 1.20 | 1.20 | 1.20 | 1.20 | 1.20 |
| Water | qs to 100 | qs 100 | qs 100 | qs 100 | qs 100 | qs 100 | qs 100 |
| Ratio DSDMAC:FA | 9:1 | 6:1 | 4.5:1 | 3:1 | 2.2:1 | 1.5:1 | 1.2:1 |

The formulations are prepared as follows:

1. The mixture of distearyl dimethyl ammonium chloride and fatty alcohol are heated up to 65° C.

2. The coloring material solution is added to the water preheated up to 65° C.

3. The perfume is added to the active ingredient mixture.

4. The premix (3) is quickly added to the water under high efficient stirring. A gel forms.

5. The gel is introduced into a high pressure homogenizer with the pressure adjusted to 700 atmospheres.

6. The product is quickly cooled to room temperature using an ice bath under slow stirring.

The softening performance of each of the compositions A-F are compared against each other. The comparisons of softening performance are made by an evaluation by six judges under the following conditions: laboratory treatment of 6 times hardened cotton terrycloth towels at a dosage of 20 ml per wash (0.112 gram active ingredients: cationic softener plus fatty alcohol per liter). Five replicates are made for each composition. The results in terms of mean scores (on a scale of 03 to +3) based on the averages for six judges-five replicates are as follows:

| Composition | Cationic Softener/Alcohol Weight Ratio | Mean Score |
|---|---|---|
| A | 9/1 | 0.131 |
| B | 6/1 | 0.374 |
| C | 4.5/1 | 0.240 |
| E | 2.2/1 | 0.140 |
| F | 1.5/1 | −0.080 |
| G | 1.2/1 | −0.673 |

The best performances are provided by the 6:1 and 4.5:1 ratios.

Example 2

This example shows the synergistic interaction between the cationic fabric softener and the fatty alcohol in increasing the softening performance of the composition. The softening performance is determined for the composition C (quat/fatty alcohol=4.5/1) of Example 1 and 3 different levels of active ingredients:

0.22 gram active ingredients per liter;

0.18 gram active ingredients per liter; and 0.13 gram active ingredients per liter.

The results are evaluated in comparison to a conventional fabric softening composition containing 5% of dimethyl distearyl ammonium chloride without any fatty alcohol at the same total active ingredients concentrations. The comparisons of softening performance are made by an evaluation of six judges under the following conditions: laboratory treatment of 6 times hardened cotton terrycloth towels at a dosage of the composition sufficient to provide each of the three different total levels of active ingredients. Five replicates are made for each formula at each weight level.

The following results are obtained with the mean scores for each formulation being based on a comparison with each of the other formulations on a scale ranging from −3 to +3 with the higher values indicating better performance:

| Composition | Mean value softening performance |
|---|---|
| DSDMAC/alcohol 0.22 gram AI/l | +0.7 |
| DSDMAC/alcohol | −0.1 |

-continued

| Composition | Mean value softening performance |
|---|---|
| 0.18 gram AI/l | |
| DSDMAC/alcohol | −0.7 |
| 0.13 gram AI/l | |
| 5% DSDMAC | +0.2 |
| 0.22 gram AI/l | |

From the above results, it can be seen that the mixture of 0.18 grams of DSDMAC plus 0.04 grams of fatty alcohol provides better softness than 0.22 grams of DSDMAC alone. Furthermore, the mixture of 0.147 grams of DSDMAC and 0.032 grams of fatty alcohol provides almost equal softness to 0.22 grams of DSDMAC alone.

Example 3

This example compares the stability of softening compositions at different weight ratios of cationic fabric softener to fatty alcohol in a 12% aqueous dispersion:

| DSDMAC/$C_{16}$–$C_{18}$ (weight ratio) | Active Ingredient (weight ratio for 12% AI formula) | Stability on Ageing Viscosity (cps) Start | After 6 weeks |
|---|---|---|---|
| 8.78/1 | 10.77/1.23 | 46 | 56 |
| 5.85/1 | 10.25/1.75 | 32 | 32 |
| 4.40/1 | 9.77/2.23 | 34 | 36 |
| 2.93/1 | 8.94/3.06 | 44 | 164 |
| 2.19/1 | 8.24/3.76 | 52 | 208 |
| 1.76/1 | 7.65/4.35 | 37600 | Gel |
| 1.46/1 | 7.13/4.87 | Gel | — |
| 1.10/1 | 6.28/5.72 | Gel | — |

From these results, it can be seen that the formulations providing the best stability on ageing are the 5.85/1 and 4.4/1 cationic softener/fatty alcohol weight ratios-at these ratios very stable, low viscosity formulations are achieved.

Furthermore, in consideration of the overall softening performance as shown in Example 1 and the stability (viscosity) performance as shown in Example 3, it can be appreciated that the best results are provided at weight ratios of cationic fabric softener/fatty alcohol in the range of about 6:1 to 2.8:1, especially 6:1 to 4:1.

Example 4

When the procedure of Example 1 is repeated for the compositions B, C and D but replacing DSDMAC with ditallow dimethyl ammonium chloride, dihexadecyl dimethyl ammonium chloride, methyl-1-tallow-amidoethyl-2-tallow imidazolinium methyl sulfate or 2-lauryl-1-hydroxyethyl-1-oleyl-imidazolinium chloride, substantially the same results are obtained.

Similarly, when a dedecanol, stearyl alcohol, palmityl alcohol, etc., are used in place of the mixed $C_{16}$ to $C_{18}$ alcohol in compositions B, C and D of Example 1, the substantially same softening performance and stability are obtained.

Example 5

The following ready-to-use composition is prepared by mixing the following ingredients:

| | % by weight |
|---|---|
| dimethyl distearyl ammonium chloride | 3.2 |
| $C_{16}$–$C_{18}$fatty alcohol | 0.8 |
| Water | 96.0 |

Example 6

Example 5 is repeated except that in place of a like amount of water, 0.5% by weight of Ethomeen T25 [tallow amine (40% $C_{16}$, 60% $C_{18}$) condensed with 15 moles ethylene oxide] is used. Similar results are achieved when the HCl or acetic acid salts of Ethomeen T25 is used in the same amount.

Example 7

When the procedure of Example 1 is repeated for composition B, C or D but replacing DSDMAC with di(ethyl tallowate)methyl hydroxyethyl ammonium chloride, di(ethylstearate) methyl hydroxyethyl ammonium chloride, or di(ethyl myristate)ethyl hydroxyethyl ammonium sulfate, substantially the same results are obtained.

What is claimed is:

1. A stable, aqueous, pourable and water dispersible fabric softener composition consisting essentially of (A) 3 to 20% by combined weight of (i) a cationic fabric softener of the formula

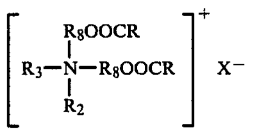

where RCO represents the residue of a fatty acid having from about 12 to 24 carbon atoms, $R_2$ is a lower alkyl of 1 to 4 carbon atoms, $R_3$ is a lower alkyl of 1 to 4 carbon atoms or a lower hydroxyalkyl of 1 to 4 carbon atoms, $R_8$ is a lower alkylene of 1 to 4 carbon atoms, and X is a salt-forming anion and (ii) a fatty alcohol having from about 10 to about 24 carbon atoms at a weight ratio of (i):(ii) of from about 4.5:1 to 3.5:1, (B) 0 to 1.5% by weight of a water soluble electrolyte, (C) 0 to 3% by weight of an ethoxylated amine emulsifier, (D) one or more optional additives selected from the group consisting of perfumes, dyes, pigments, opacifiers, germicides, optical brighteners, anticorrosion agents, and preservatives, the amount of each additive being up to 0.5% by weight, and (E) balance to 100% of water.

2. The composition of claim 1 wherein RCO represents the residue of a fatty acid having from 14 to 18 carbon atoms; $R_2$ is methyl or ethyl, $R_3$ is hydroxyethyl and $R_8$ is $-CH_2CH_2-$.

* * * * *